United States Patent [19]
McClellan et al.

[11] 3,785,029
[45] Jan. 15, 1974

[54] METHOD OF ASSEMBLING INSERTS WITH PRECISION LOOSENESS

[75] Inventors: Alan J. McClellan, Germantown, Ohio; Harold R. Dutton, deceased, late of Dayton, Ohio by Edna M. Dutton, executrix

[73] Assignee: General Motors Corporation, Detroit, Mich.

[22] Filed: Aug. 28, 1972

[21] Appl. No.: 284,164

[52] U.S. Cl............... 29/157.1 R, 29/437, 29/512, 29/523, 251/205, 251/365
[51] Int. Cl............................................. B21k 25/00
[58] Field of Search............... 29/157 C, 157.1 R, 29/437, 512, 523; 251/205 X, 365 X

[56] References Cited
UNITED STATES PATENTS

| 438,572 | 10/1890 | Coffield | 251/365 |
|---|---|---|---|
| 500,214 | 6/1893 | Richards | 29/157.1 R |
| 610,744 | 9/1898 | Henion | 251/365 |
| 801,458 | 10/1905 | Huxley | 251/365 |
| 1,468,662 | 9/1923 | Gifford | 29/512 UX |
| 1,647,992 | 11/1927 | Hartman | 29/512 UX |
| 1,909,478 | 5/1933 | Wilson | 29/157.1 R X |
| 2,087,969 | 7/1937 | Gookin | 29/512 |
| 2,121,464 | 6/1938 | Zagorski | 251/365 |
| 2,462,138 | 2/1949 | Spangenberg | 29/437 X |

Primary Examiner—Charlie T. Moon
Attorney—W. E. Finken et al.

[57] ABSTRACT

In an illustrative embodiment, a limitedly radially slidable orifice element or insert is assembled within an aperture of a piston end cap of a hydraulic dashpot type of mounting unit for automotive vehicle bumpers. The orifice insert is assembled in the end cap by a method involving the forming of at least one radial flange in a crimping-like operation to tightly engage it and an opposite preformed flange with respective surfaces of the end cap, and subsequently reforming one of the flanges to displace the other a predetermined distance from its respective end cap surface affording precision clearance for relatively free sliding movement of the insert within the end cap.

4 Claims, 6 Drawing Figures

PATENTED JAN 15 1974

3,785,029

METHOD OF ASSEMBLING INSERTS WITH PRECISION LOOSENESS

This invention relates to methods of assembly for self-retention of inserts within apertures of members and more particularly to a method for assembling such inserts with precision looseness permitting relatively free lateral shiftable movement of the insert within such aperture.

Prior methods of assembly for permanently attaching inserts within apertured members have generally been directed to either quite firm engagement of the insert within the member, or indiscriminate looseness of the insert arising from only partial rolling, crimping or like formation of a flange of the insert in a single step of the assembly operation. In certain instances, it is desirable to assemble such an insert for permanent retention with but a slight yet precise clearance sufficient to permit relatively free lateral shifting of the insert within an oversized aperture of the apertured member; i.e., no gross looseness. Such is particularly the case, for example, in the assembly of an orifice element within the piston end cap of the disclosed illustrative embodiment of a hydraulic dashpot bumper mount unit for automobile bumper systems. There, the orifice element is situated within an oversized aperture in the piston end cap of a piston tube assembly telescopically related with a cylinder tube having affixed thereto a metering rod which projects through the fluid flow aperture of the orifice element for controlled metering of fluid flow during telescoping of the bumper mount unit. To accommodate limited misalignment normally encountered in manufacture and assembly of the several parts of the bumper mount unit, the orifice element should be free to center itself with the metering rod through the provision of room for lateral shifting of the element and with a precise clearance between the retaining flanges of the orifice element from the juxtaposed surfaces of the end cap. Such clearance should not be indiscriminately loose to any extent allowing uncontrolled and unpredictable fluid flow through such clearance space remote from the metering rod.

In accordance with these objectives, the present invention features a method of assembly of inserts within apertured members wherein flanges are formed on the insert for juxtaposition to opposite walls of the member adjacent the edge of the aperture, the method involving reformation of at least one of the flanges from an initially tight engagement of the flanges with the member to a displaced condition of the insert wherein precise clearance is provided affording the desired free lateral or radial shifting movement of the insert.

Another feature of this invention is in the formation of such flanges with precise clearance as part of an automated process such as involved in transfer presses so as to provide the required precision assembly without sacrificing speed or economy of manufacture.

These and other features and advantages of the invention will be readily apparent from the following specification and from the drawings wherein.

Figure 1:
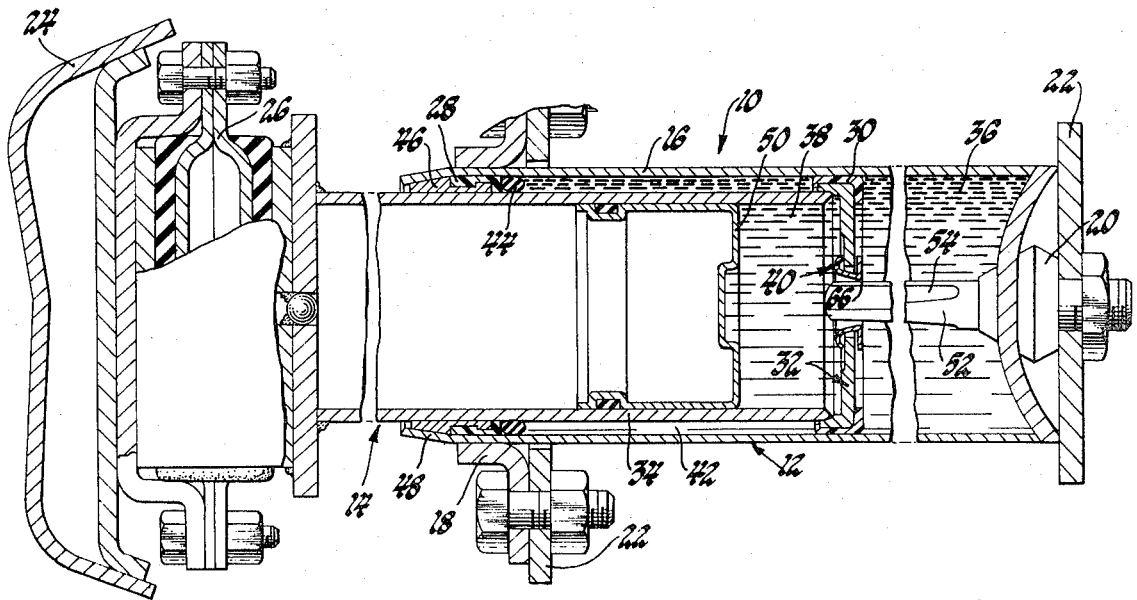
FIG. 1 illustrates an assembled article realized by the process of this invention and shown in the illustrative environment of an automotive hydraulic dashpot type bumper mount unit.

Referring particularly to FIG. 1 of the drawings, there is shown a hydraulic dashpot vehicle bumper mount unit, disclosed generally as 10, which incorporates an orifice element and piston end cap assembled in accordance with the method of this invention. For details of the bumper mount unit, its operation and its application within the bumper system of an automotive vehicle, reference should be had to Jackson et al, U.S. Ser. No. 91,008 filed Nov. 19, 1970, now U.S. Pat. No. 3,700,273, and assigned to the assignee of the present invention. Generally, however, the bumper unit comprises telescopically arranged cylinder tube and piston tube subassemblies 12 and 14 respectively. Cylinder tube assembly 12 includes an outer tube or vessel 16 having secured thereto a forward flange 18 at one end and a mounting stud 20 at the opposite end suitable for attachment to spaced flange structures 22 which project from, for example, the sides of the longitudinally extending forward frame rail portions or horns of the vehicle.

Telescopically received within cylinder tube 16 with relatively close fit is the piston tube assembly 14, which latter has fixedly attached to the outer end thereof the usual vehicle bumper or impact face bar 24. It will be understood that at least two bumper mount units 10 are employed, one at either side of the vehicle frame, for attachment to respective end portions of the face bar 24. The attachment to the face bar is best afforded by a pivot structure such as illustrated at 26 which may include an elastomeric bushing between flanges attached respectively to the piston tube assembly and the face bar affording limited rotation on a vertical axis between such flanges as can arise from cornering impacts on the face bar tending to displace one end of the same relative to the vehicle a greater distance than the opposite end of the face bar.

The piston tube assembly is relatively closely slidably fitted within cylinder tube 16 by a pair of longitudinally spaced bearings 28 and 30 deriving from the cylinder tube assembly firm structural support for the face bar during all manner of operating conditions of the vehicle and utilizing material antifriction properties such as available from glass-filled nylon or the like to present substantially no impediment to telescoping of the piston tube subassembly inwardly of the cylinder tube during impact. Such telescoping occurs as between a normal extended position, as shown, and any of a plurality of inwardly displaced positions carrying a piston end cap 32, which is welded or otherwise secured to the end of piston tube 34, toward the inner end wall of the cylinder tube 16. Such displacement of course changes the relative volume of two working chambers 36 and 38 of the bumper mount unit and forces hydraulic fluid such as oil which is contained therein to flow through an orifice element 40 of mild or low carbon steel. Working chamber 36 may include an annular volume 42 surrounding the piston tube 34 and closed at the forward end of the unit by a sealing O-ring 44 backed up by the bearing 28. To firmly support the piston tube assembly on the cylinder tube assembly in the extended relationship shown, a stop ring 46 affixed to the piston tube 34 and supporting the bearing 28 has a generally frustoconical surface tightly engageable with a complementary crimp surface 48 at the end of the cylinder tube 16.

Within the piston tube 34 is a variable volume working chamber 38 which is closed at one side by a gas piston 50 sealed by an O-ring to the inner surface of piston tube 34 to contain a pressurized volume of nitrogen or other inert gas. Such gas is subject to compression by piston 50 during impact caused telescoping within bumper mount unit 10, thereby to act as a spring which will return the unit to its normal extended condition, as shown, upon release of the impact force on face bar 24.

A metering rod 52 affixed generally on the centerline of the unit to the end wall of cylinder tube 16 projects into the orifice or center opening of orifice element 40 and has flats 54 thereon providing controlled flow area between the periphery of the metering rod and the inner lip 66 of the orifice element. Such flats 54 are of varying depth to provide varying flow area as the piston tube assembly telescopes inwardly whereby to provide a tailored generally constant pressurization force within the unit as the velocity of telescoping varies during impact.

Because of limited amounts of manufacturing tolerance misalignment possible between the metering rod 52 and the axis of the piston tube subassembly during telescoping, it is desirable to permit orifice element 40 to "float" or displace radially a limited distance to maintain a uniform operating relationship with the metering rod as the bumper mount unit 10 is telescoped.

Figure 6:
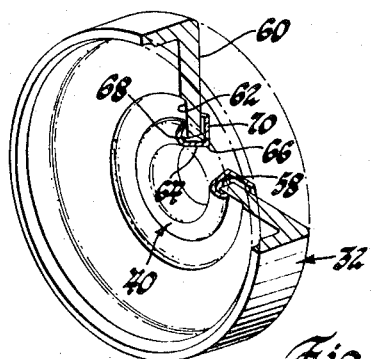
FIG. 6 is a partially broken away perspective view illustrating the finished article.

Referring to FIG. 6, a preferred construction for the assembly of parts including piston end cap 32 and orifice element 40 is shown. Piston end cap is apertured centrally at 58 to have inserted therein the orifice element. The opposite surfaces or walls of the piston end cap designated 60 and 62 are preferably planar adjacent such aperture 58. The orifice element 40 includes an annular wall 64 terminating in the inner sharp orificing edge 66, and formed integrally with annular wall 64 are opposed flanges 68 and 70. As indicated in FIG. 6, slight looseness of the inserted orifice element 40 is provided by a precise clearance illustrated by the space between flange 70 and piston end cap wall 60. Further, the outer dimension of the annular wall 64 is predeterminedly smaller than the aperture 58. This latter dimensional difference is predetermined to accommodate the maximum axial misalignment expected between the metering rod 52 and the axis of piston tube assembly 14 on which the aperture 58 is centered. The clearance gap between flange 70 and wall 60 is precisely predetermined so that, while the two flanges 68 and 70 positively retain the orifice element, they impose no substantial frictional resistance to self-induced centering or alignment of the orifice element relative to the metering rod during telescoping of the bumper mount unit 10. The clearance gap shown at flange 70 should be held closely so that there is no possibility of significant fluid flow at the outside of the orifice element 40 around its flanges and through the clearance space between annular wall 64 and aperture 58 causing unpredictable fluid flow conditions during telescoping of the unit 10 or rebound thereof from the gas spring. A typical desired clearance space is .005 inches. It is to be appreciated that the clearance space shown at 70 in FIG. 6 is merely illustrative and in practice represents looseness between flange 68 and wall 58 as well. Indeed, with such clearance gap, the orifice element will shift axially of the end cap to abut one flange or the other thereon depending on the direction of the moderate pressure differentials normally experienced either side of the end cap during telescoping of unit 10.

Figure 4:
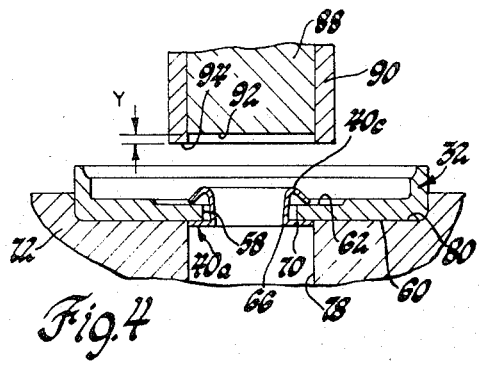
FIG. 4 is another similar view illustrating a further subsequent step.
Figure 2:
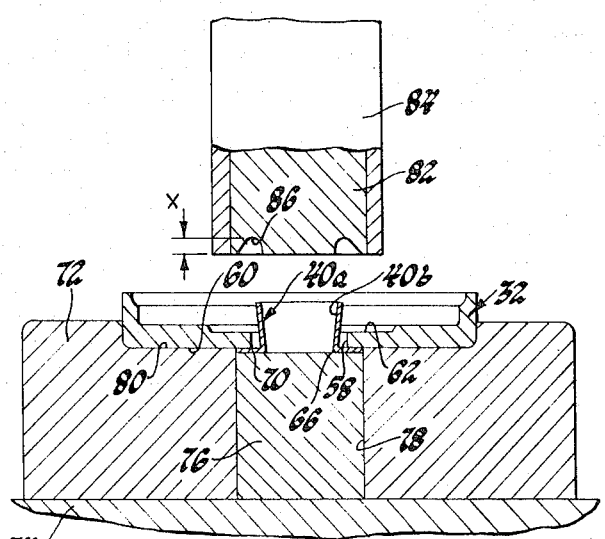
FIG. 2 is a view, partially broken away, illustrating an initial step in the assembly method of this invention.
Figure 3:
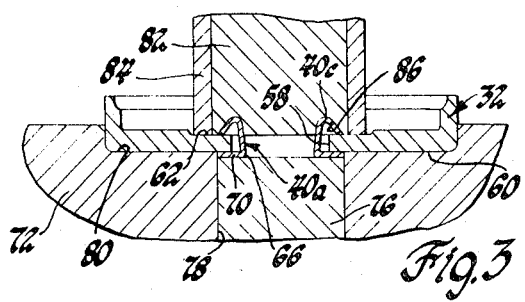
FIG. 3 is a view similar to FIG. 2 showing completion of a next subsequent step.

Referring to FIG. 2, there is illustrated an initial step in the method of assembly and fabrication of the assembled article of FIG. 6. Piston end cap 32 is firmly seated on a fixture plate 72 which may be part of an automated transfer press or the like. Such plate rests on a support 74 of the press, which latter contains a tool support or reaction member 76 within a bore 78 of the fixture plate 72. The upper surface of tool support 76 is recessed from a supporting surface 80 of plate 72 a precise distance to accept the thickness of a preformed flange of the orifice element 40. Such orifice element is shown in a blank form 40a, in FIG. 2 wherein it includes the preformed flange, which may be flange 70 as seen in FIG. 6, as well as a generally frustoconical annular wall 40b upstanding from flange 70 and which has been inserted within aperture 58 of the end cap. It is to be noted that the upper surface of the tool support is planar to press generally planar flange 70 against end cap wall 60 during the press operation. The next step utilizes a tool 82 affixed within tool holder 84 attached to a movable ram of the press. Tool 82 includes an annular work engaging surface conformation 86. The depth of such conformation is indicated in FIG. 2 by the distance X. Downward motion of tool 82 in its holder engages the work engaging conformation 86 with the upper annular lip of upstanding wall 40b and deforms and stretches the same into a crimped or curled flange 40c, the completion of this step being illustrated in FIG. 3. The intermediate state of the assembled article following lifting of tool 82 is seen in FIG. 4. The material upsetting curls flange 40c into engagement firmly with planar surface 58 but generally only at the outer edge or lip of such flange. The orifice element 40a has both its flanges thus firmly engaged with the piston end cap.

Figure 5:
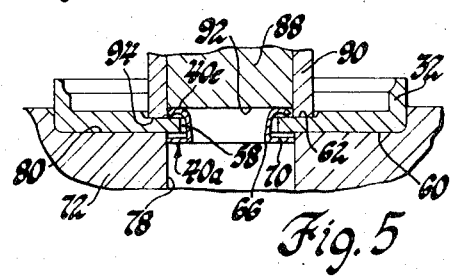
FIG. 5 is another similar view showing the insert assembly completed.

Following lifting of the tool 82, the assembled article in its intermediate state is then reconditioned within the press to the situation or station illustrated in FIG. 4 wherein the piston end cap still rests on a supporting surface in its fixture 72 but all support is removed from the lower flange 70 of the orifice element. Flange 40c is then restruck by another tool 88 attached to a movable ram by a tool holder 90. Tool 88 includes a work engaging surface 92 of planar conformation which is recessed a distance Y from a stop or reference surface 94 of the tool holder 90. The completion of this restriking of curled flange 40c is illustrated in FIG. 5 where it is seen that the reference surface 94 limits the extent of the restriking motion of tool 88 by its engagement with piston end cap surface 58. With the piston end cap being firmly supported on the press fixture support 74, and the fact that the orifice element blank 40a is unsupported other than at the edge or lip of flange 40c, work engaging surface 92 further upsets and reforms the material of such flange to the condition shown in FIG. 5. There, the height of flange 40c has been partially uncurled or flattened about the engaged outer lip thereof and the flange 70 has been displaced from end cap surface 60 a precise distance. This precise distance is controlled by the depth of recess between work engaging surface 92 and reference surface 94 indicated by distance Y. Thus, in effect, the amount of clearance established at the flange 70 as shown in FIG. 5 is a function of the difference between distances X and Y.

It is of course to be appreciated that the specific tools and steps of operation illustrated and described in the foregoing may be considered in some respects peculiar to the finished shape of orifice element 40 as seen in FIG. 6. The generalized approach to precision looseness of an insert in an apertured member is adaptable to other shapes of flanges for the insert. For example, where the insert need have no sharp orifice edge 66, the planar shape of flange 70 may be discarded. It may be, for example, preformed in a curl similar to the flange 40c and the tool support 76 may be suitably shaped to accept such a flange and support it during the initial press steps of FIGS. 2 and 3. The steps of FIGS. 4 and 5 may then involve restriking of either one of such curled flanges. Other departures or modifications from the generalized approach disclosed herein may also be utilized.

Having thus described the invention, what is claimed is:

1. In a method of forming an assembly including an apertured member and an insert in the aperture thereof having opposite flanges juxtaposed to respective walls of said member at the edge of the aperture, said flanges having a predetermined precise clearance from said walls, the steps comprising, inserting within said aperture of said member an insert blank having a preformed one of said flanges and an upstanding annular wall connected with said one flange, striking said upstanding wall with a tool while supporting said preformed flange firmly engaged in at least a local region thereof with its respective wall of said member to bend an upper portion of said annular wall into a flange firmly engaged in only a localized region thereof with the opposite wall of said member, and restriking a non-engaged portion of one of said flanges with a tool while said member is supported and the other flange is unsupported to bend said restruck flange toward its respective wall and remove the opposite flange from its respective wall of said member to a precise extent providing the predetermined clearance required between the flanges of said insert and the respective walls of said member.

2. In a method of forming an assembly including an apertured member and an insert in the aperture thereof having opposite flanges juxtaposed to respective generally planar walls of said member at the edge of the aperture, said flanges having a predetermined precise clearance from said walls, the steps comprising, inserting within said aperture of said member an insert blank having a preformed generally planar one of said flanges and an upstanding annular wall connected with said one flange, striking said upstanding wall with a tool while supporting said one flange firmly engaged with its respective wall of said member to bend an upper portion of said annular wall into a curled flange firmly engaged in only an outer edge region thereof with the opposite wall of said member, and restriking a nonengaged portion of said curled flange with a tool while the member is supported and said one flange is unsupported to further bend said curled flange toward its respective wall and remove said one flange from its respective wall of said member to a precise extent providing the predetermined clearance required between the flanges of said insert and the respective walls of said member.

3. In a method of forming an assembly including an apertured member and an insert in the aperture thereof having opposite flanges juxtaposed to respective walls of said member at the edge of the aperture, said flanges having a predetermined precise clearance from said walls, the steps comprising, inserting within said aperture of said member an insert blank having a preformed one of said flanges and an upstanding annular wall connected with said one flange, striking said upstanding wall with a tool while supporting said preformed flange firmly engaged in at least a local region thereof with its respective wall of said member to bend an upper portion of said annular wall into a flange firmly engaged in only a localized region thereof with the opposite wall of said member, supporting said member, removing support from one of said flanges and restriking a nonengaged portion of the other of said flanges with a tool which has a reference surface engageable with said member and a flange striking surface recessed from said reference surface a predetermined amount related to said predetermined clearance to bend said restruck flange toward its respective wall and remove the opposite flange from its respective wall of said member to a precise extent limited by engagement of said reference surface with said member, thereby to provide the predetermined clearance required between the flanges of said insert and the respective walls of said member.

4. In a method of forming an assembly including an apertured member and an insert in the aperture thereof having opposite flanges juxtaposed to respective generally planar walls of said member at the edge of the aperture, said flanges having a predetermined precise clearance from said walls, the steps comprising, inserting within said aperture of said member an insert blank having a preformed generally planar one of said flanges and an upstanding annular wall connected with said one flange, striking said upstanding wall with a tool while supporting said one flange firmly engaged with its respective wall of said member to bend an upper portion of said annular wall into a curled flange firmly engaged in only an outer edge region thereof with the opposite wall of said member, supporting said member, removing support from said one flange and restriking a nonengaged portion of said curled flange with a tool which has a reference surface engageable with said member and a flange striking surface recessed from said reference surface a predetermined amount related to said predetermined clearance to further bend said curled flange toward its respective wall and remove said other flange from its respective wall of said member to a precise extent limited by engagement of said reference surface with said member, thereby to provide the predetermined clearance required between the flanges of said insert and the respective walls of said members.

* * * * *